J. H. BRIMSON.
VARIABLE SPEED MECHANISM.
APPLICATION FILED FEB. 10, 1913.
1,101,681.
Patented June 30, 1914.
3 SHEETS—SHEET 1.
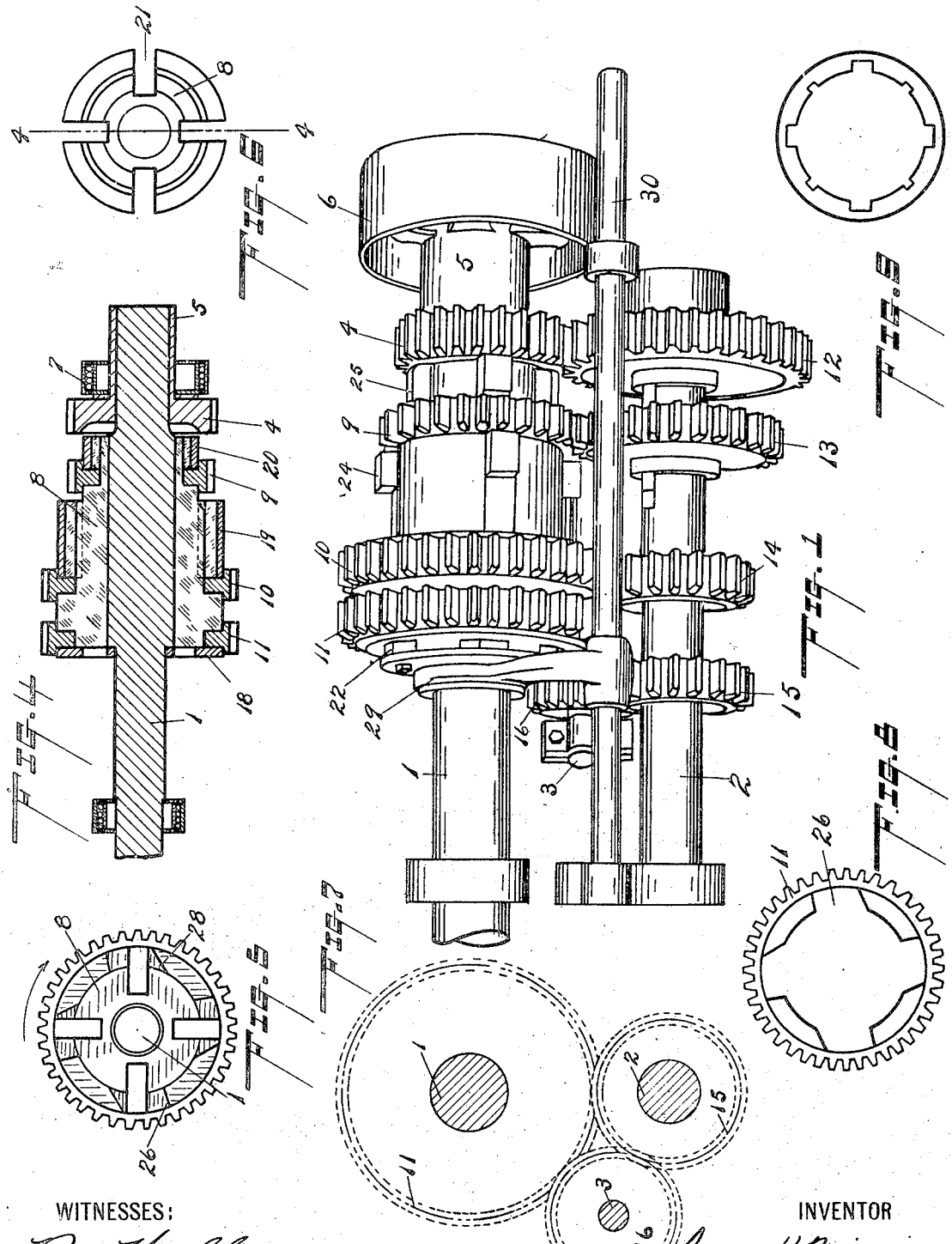
WITNESSES:
Roy Wallis
Willie M. Angus
INVENTOR
James H Brimson
BY
Geo. B. Willey ATTORNEY

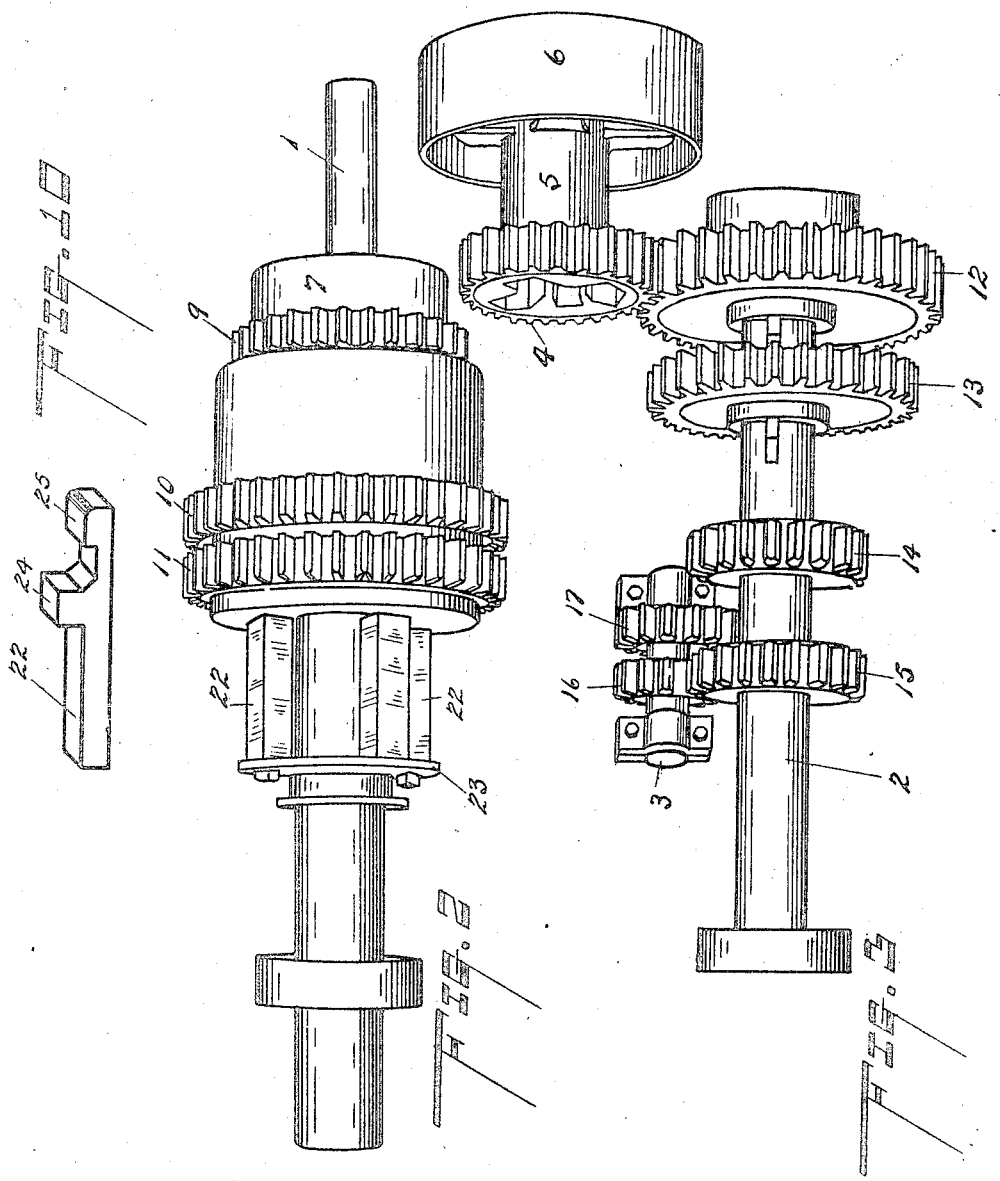

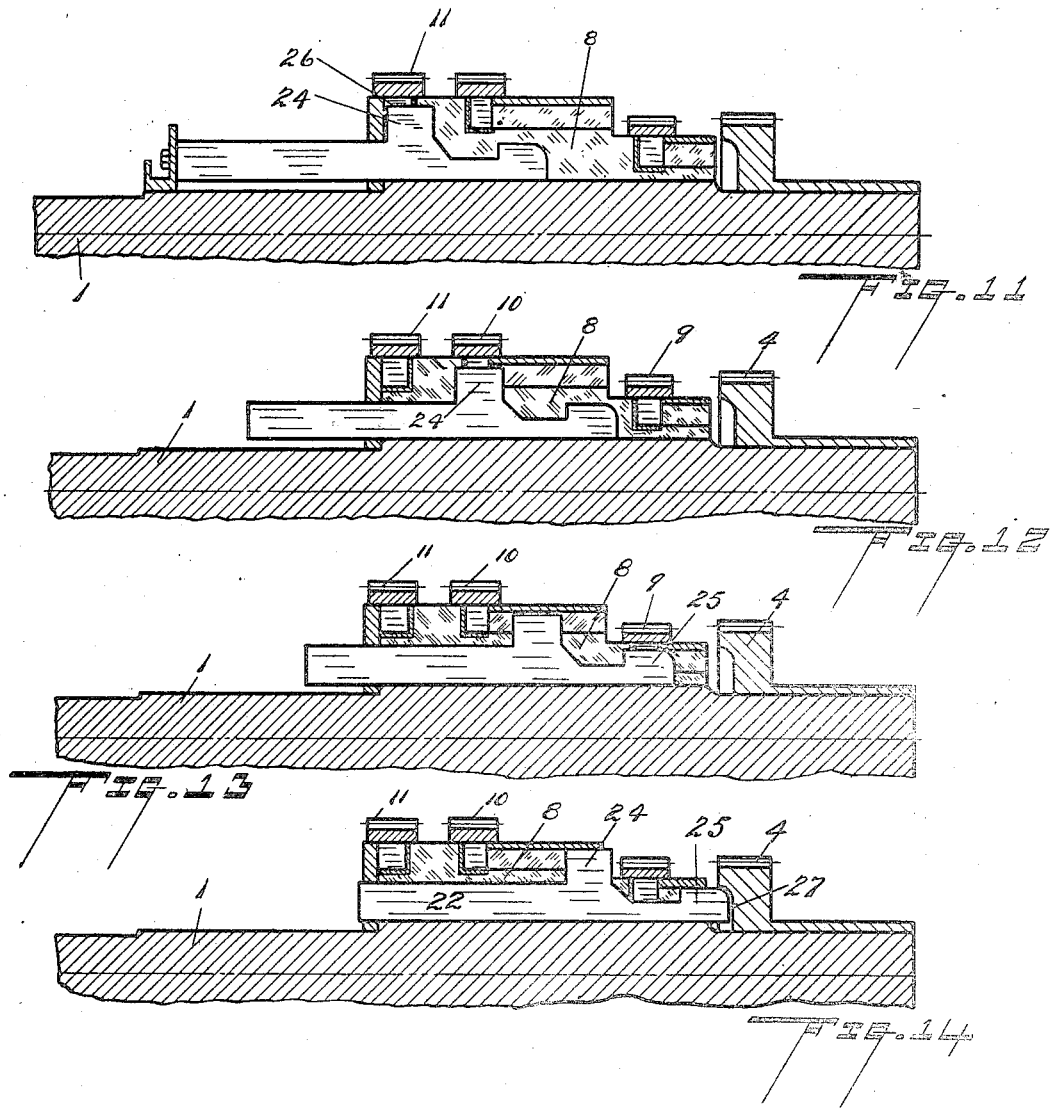

UNITED STATES PATENT OFFICE.

JAMES H. BRIMSON, OF SAGINAW, MICHIGAN, ASSIGNOR OF ONE-HALF TO WILLIAM H. HART, OF SAGINAW, MICHIGAN.

VARIABLE-SPEED MECHANISM.

1,101,681.  Specification of Letters Patent.  Patented June 30, 1914.

Application filed February 10, 1913. Serial No. 747,473.

*To all whom it may concern:*

Be it known that I, JAMES H. BRIMSON, a citizen of the United States, residing at Saginaw, in the county of Saginaw and State of Michigan, have invented certain new and useful Improvements in Variable-Speed Mechanism; and I do hereby declare the following to be a full, clear, and exact description of the invention, such as will enable others skilled in the art to which it appertains to make and use the same.

This invention relates to change speed gears and transmissions such as are commonly employed in the transmission mechanism of automobiles and like machinery, in which a number of speeds ahead are required and one or more speeds to reverse.

The objects of my invention are, first, to provide a change speed gear in which the speed is changed by throwing gears of different speed ratios into and out of operation, but so constructing the mechanism that the teeth of the gears are not disengaged or slid into mesh when speed change occurs, thus saving wear on the teeth and reducing liability of breakage.

A further object is to provide a change speed device in which all of the gears are rotating all of the time when the machine is in operation, so that the shift from one speed to another may be made while the gears are in motion, it being unnecessary to start a gear from rest when a shift in speed is to be made.

With these and certain other objects in view which will appear later in the specification, my invention consists in the devices described and claimed and the equivalents thereof.

In the drawings, Figure 1 is a perspective view of the change speed device assembled; Fig. 2 is a perspective view of the drive shaft with the loose gears in place; Fig. 3 is a perspective of the drive gear and counter shaft; Fig. 4 is a longitudinal section on line 4—4 of Fig. 6 through the loose gears and the drive shaft; Fig. 5 is an end view of the same with the collar and keys removed; Fig. 6 is an end view of the stepped cone or drum, the gears being removed; Fig. 7 is a diagrammatic view of the reverse gears; Fig. 8 is a view of one of the loose gears; Fig. 9 is an end view of one of the sleeves that hold the loose gears on the drum; Fig. 10 is a perspective detail of a shifting-key; Fig. 11 is a part sectional detail through the hub and shaft, showing the shifting-key in position to drive the reverse gear; Fig. 12 is a similar view showing the key in position to drive the slow speed gear; Fig. 13 is a similar view showing the key in position to drive the intermediate gear; Fig. 14 shows the key in position to drive the shaft 1 at high speed, which is the speed of the motor.

As is clearly shown in the drawings, the device consists in a main shaft 1, counter shaft 2, and an idler shaft 3, upon which appropriate gears are mounted. At one end of the main shaft 1 and mounted to revolve loosely thereon is a drive gear 4 having a quill hub 5, to which the driving power may be applied in any suitable manner, as by means of a drive pulley 6 or any suitable clutch fixed to the quill 5. The quill 5 may be mounted in suitable anti-friction bearings 7. Upon shaft 1 is a stepped cone or drum 8, and upon this drum a plurality of gears are loosely mounted, each gear being capable of revolving on the drum, as on a journal. Any desired or convenient number of gears of various diameters may be employed, but for purpose of illustration I have shown three such gears, of which 9 is the intermediate speed gear; 10 the slow speed gear; and 11 the reverse gear. The manner in which these gears are actuated will be described later.

The counter shaft 2 carries a driven gear 12 that meshes with gear 4 and a gear 13 that meshes with gear 9; also a gear 14 meshing with gear 10 and a gear 15 that meshes with a pinion 16 fixed to the idler shaft 3. All of the gears on shaft 2 are rigidly fixed to it. Fixed to idler shaft 3 and adjacent to pinion 16 is a second pinion 17 (Fig. 3) that meshes with the reverse gear 11 on shaft 1.

When gear 4 is rotated by the motor or other source of power, it rotates gears 13, 14 and 15, and these gears respectively rotate the loose gears 9 and 10 in one direction and gear 11 (through pinions 16 and 17) in the opposite direction.

Since shaft 1 is revoluble within the quill 5 and since all of the gears 9, 10 and 11 are revoluble on the drum 8, which is fixed to shaft 1, no power will be transmitted by shaft 1 until one or the other of the gears 4, 9, 10, or 11 is locked to that drum.

The means by which any one of these gears may be locked to the drum while all the others remain loose will now be described. The drum, as shown in Figs. 4 and 6, consists in a series of stepped cylindrical bearings upon which the gears 9, 10 and 11 may rotate. These gears are without spokes or hubs, consisting merely of annular rings with external gear teeth. Gear 11 is held in place on the drum by a collar 18, gear 10 by sleeve 19 keyed or otherwise secured to the drum; gear 9 by sleeve 20. To lock any one of these gears to the drum, I form the drum with one or more radial slots 21, within each of which is slidingly received a key 22. In practice I prefer to provide four such slots as shown in Fig. 6 and to provide four corresponding keys, the ends of which are secured to a sliding collar 23, so that all four keys may be slid in and out along the slots 21 when the collar is moved lengthwise shaft 1. Each key is formed with an outwardly projecting lug 24 and a similar, but smaller lug 25. Each of the drum gears, as 11, has its interior rim formed with slots 26, see Fig. 8, to receive the corresponding lug, as 24, of the key 22, the side walls of the slots forming shoulders to be engaged by the sides of the lugs when the lugs are inserted in the slots. When a lug, as 24, has entered the corresponding slot, as 26, of gear 11 (see Fig. 11) and the gear is rotated by means of its corresponding gear 15 (Fig. 1) and the pinions 16 and 17, shaft 1 will be positively rotated in the opposite direction to that of the drive gear 4. When the key is pushed in so that projection 24 engages the slot of gear 10, as shown in Fig. 12 shaft 1 will be driven at slow speed in the same direction as gear 4. When the key is moved until projection 25 registers with the slot of gear 9, as shown in Fig. 13, shaft 1 will be driven in the same direction as gear 4, but at an intermediate speed. When the key is moved so that projection 25 engages the recess 27 of gear 4, as shown in Fig. 14, shaft 1 will be driven in the same direction and at the same speed as gear 4, this being high speed. The spacing apart of gears 4, 9, 10 and 11 and the spacing apart of projections 24 and 25 on the key 22 are such that between each of the adjustments above described both of the projections will be out of engagement with the gears, allowing all the gears to rotate without driving shaft 1. This is to insure that in changing speed by shifting the key, each gear will be thrown out of action before the next gear is thrown in. In practice I prefer to bevel one wall of each slot 26, as at 28 in Fig. 5, to facilitate the entering of the projection. To shift the collar 23 and thereby to shift keys 22, I provide an arm 29, (Fig. 1) or equivalent member that may be mounted on any suitable support, as a longitudinally movable shaft 30 and this shaft may be actuated by any suitable means. An incidental advantage of this construction is that the shaft 30 or any equivalent shifting device may be located at almost any desired point around the circumference of the gears on shaft 1. This construction enables the handling mechanism by which shaft 30 is to be actuated, to be located at almost any convenient or accessible place about the mechanism.

Having described my invention, what I desire to secure by Letters Patent is as follows:

1. In a variable speed device, a main shaft carrying a stepped cone, a drive gear revoluble thereon; a counter shaft having gears fixed thereon; said cone having radial slots formed therein and located outside the periphery of the shaft; gears of various diameters revolubly mounted on the successive steps of the cone and permanently meshing with the gears on the counter shaft; keys slidingly received in the slots of said cone, each key formed with a plurality of outwardly projecting lugs; each gear on said cone having an interior rim formed with transverse slots to receive said lugs, and means for simultaneously moving said keys along their slots.

2. In a variable speed device of the class described, having a main shaft carrying a stepped cone, a plurality of gears of various diameters spaced apart and revolubly mounted on the respective steps of said cone, said cone formed with a plurality of radial slots extending lengthwise, but located outside the periphery of the shaft; keys slidingly received in the slots of said cone, each key formed with a plurality of outwardly projecting lugs of various heights and spaced apart, whereby all the lugs are adapted to be thrown out of engagement with the gears when the keys are in intermediate position.

3. In a variable speed device, the combination with a counter shaft having gears fixed thereon, a main shaft carrying a stepped cone, and a drive gear revoluble on said shaft, said cone having radial slots formed therein and located outside the periphery of the shaft; gears of various diameters revolubly mounted on the respective steps of the cone and permanently meshing with the gears on the counter shaft, said gears being spaced apart along said cone; keys slidingly received in the slots of said cone, each key formed with a plurality of outwardly projecting lugs of various heights, said lugs spaced apart along said keys; each gear on said cone having an interior rim formed with transverse slots to receive said lugs, and means for simultaneously moving said keys along their slots.

In testimony whereof, I affix my signature in presence of two witnesses.

JAMES H. BRIMSON.

Witnesses:
 NELLIE M. ANGUS,
 JOS. V. CARPENTER.